United States Patent [19]

Ferreira

[11] Patent Number: 4,701,797

[45] Date of Patent: Oct. 20, 1987

[54] MINIATURE TELEVISION TRANSMITTER

[75] Inventor: Leonidas Ferreira, Brussels, Belgium

[73] Assignee: C³ E M Company Ltd., London, England

[21] Appl. No.: 618,297

[22] Filed: Jun. 7, 1984

[51] Int. Cl.⁴ ............................................. H04N 5/38
[52] U.S. Cl. .................................... 358/186; 358/141
[58] Field of Search ....................... 358/186, 141, 108; 455/128

[56] References Cited

U.S. PATENT DOCUMENTS

| | | | |
|---|---|---|---|
| 2,881,427 | 4/1959 | Haber | 358/141 X |
| 3,995,105 | 11/1976 | Krivosheev et al. | 358/139 |
| 4,091,423 | 5/1978 | Branscome | 358/260 X |
| 4,498,105 | 2/1985 | Crawshaw | 358/213 |
| 4,516,157 | 5/1985 | Campbell | 358/108 |
| 4,605,959 | 8/1986 | Colbaugh | 358/93 |

Primary Examiner—Michael A. Masinick
Assistant Examiner—E. Anne Toth
Attorney, Agent, or Firm—Sughrue, Mion, Zinn, Macpeak, and Seas

[57] ABSTRACT

A small lightweight portable television transmitter having few components and operable with NTSC, PAL and SECAM systems. A one transistor video amplifier receives a gain controlled video signal and adjusts the d.c. level. Common mode noise rejection and sync pulse stretching is provided by a two transistor single ended output differential amplifier. The r.f. modulator combines and emitter follower and a one transistor mixer, with the r.f. applied to the collector and the modulating signals, including video and an audio modulated subcarrier, applied to the base. The transmitter has less than about 210 electrical components, weighs less than 1 kg when constructed with discrete components and substantially less when integrated into a hybrid circuit, yet provides 3 watts minimum peak power.

41 Claims, 8 Drawing Figures

MINIATURE TELEVISION TRANSMITTER

BACKGROUND OF THE INVENTION

1. Field of the Invention

The present invention is in the field of television transmitters and, more particularly, is directed to a small, lightweight, inexpensive, portable lowpower television transmitter having a relatively small amount of circuitry yet providing high quality television transmission over medium distance ranges.

2. Prior Art

Over the past several years there have been significant advances made in the miniaturization of tv cameras and tv receivers. For example, there are many models of tv cameras presently on the market which utilize CCD or MOS arrays and which can be held comfortably by an operator. Furthermore, costs have been reduced to the point where such cameras have become readily affordable for home entertainment use, particularly in connection with video recorders. Also, a tv camera which can be held comfortably in the palm of a single hand is commercially available from Polnix, Inc., of California. Miniaturization of tv receivers has been even more dramatic. As the most prominent example, tv receivers having wristwatch type screens plus a receiver box which can be worn on the viewer's belt are presently commercially available from at least one Japanese manufacturer.

Television transmitters, on the other hand, have not kept pace with the latter advances. For purposes of consistency, a television transmitter, as described herein comprises the equipment which receives the video signal plus sync pulses (hereinafter referred to simply as the video signal) and provides an R.F. carrier modulated by the video to a suitable transmitting antenna. The transmitter may be defined to additionally incorporate the antenna itself. Also, the television transmitter includes the circuitry which receives the audio, modulates it onto a carrier or subcarrier, and transmits it along with the video modulated R.F.

As an example of a standard broadcast television transmitter, a 100 watt system, which is not considered to be overly powerful, would be approximately the size of a huge cabinet (e.g., 2.2 meters in width X 2.3 meters in height×0.7 meters in depth), weighing approximately 1 ton, cost approximately $70,000 and have a range of 25 km. Such a system, obviously is not portable.

Portable television transmitters are commercially available, but they are too complex, too expensive, and too heavy. Thompson C.S.F., a French company, markets a portable transmitter weighing 10 kilograms and providing 1 watt of power. The latter portable transmitter operates on a frequency of 1.2 gigahertzs with FM modulation. Inasmuch as all commerical television receivers throughout the world operate on amplitude modulated video signals in the megahertz range, the Thompson portable transmitter is not suitable for transmitting directly to commercial television receivers but can transmit only to specially adapted receiving equipment. The Thompson portable transmitter has a size of approximately 30 centimeters width×25 centimeters height×35 centimeters depth, costs in the neighborhood of $30,000 and has a range of 5 kilometers.

Rhode & Schwarz, GMbH of Germany also markets a portable tv transmitter. That transmitter weighs about 25 kilograms, provides an amplitude modulated signal with a carrier between 470 and 860 megahertz at 5 watts of power and costs approximately $30,000.

As is apparent, the size and costs of present day tv transmitters makes them unsuitable for a wide variety of applications and for use by consumers in connection with home entertainment.

A composite video signal includes the synchronization pulses and the video information, which includes luminance and chrominance signals (for color) or only luminance (for black and white). A television transmitter typically includes a dc restoration circuit, also known as a black level clamping circuit, for properly positioning the video signal relative to 0 volts dc. For the PAL (Germany) and NTSC (U.S. and Japan) systems, the video information is negative and the horizontal sync pulses are positive. In the SECAM system (France) the video information is positive and the horizontal sync pulses are negative.

A transmitter receives the composite signal via cables, rebroadcast receivers, or microwave relay links. The distortion that can occur, especially to the synchronizing pulses, must be taken into account. Standard transmitters convert the incoming signal into a standard television waveform, regenerate the sync pulses and stabilize the video level. The composite video signal often varies in its dc level and therefore the picture.

One type of prior art dc restoration circuit typically operates by reinserting the d.c. component on the tips of the synchronization signal, using relative values required by signal standards. This type of reinsertion is subject to noise impulse interference and is not accurate. Consequently, it has been necessary to add several compensation circuits to avoid such malfunctions. These additional circuits further increase the size and complexity of the transmitter and are themselves liable to additional errors. As another example, some receivers include separate synchronous signal regenerators for correcting the sync pulses as well as establishing the proper dc level. See for example *Electronics Engineers' Handbook*, 2nd Ed., 1982, McGraw-Hill, Inc., FIG. 21-16, pp. 21-32. Clamping circuits should be used for dc restoration in that they are more accurate, faster and less liable to noise interference. However, they are infrequently used because of their complexity and cost.

In a typical television transmitter, the composite video modulates an R.F. carrier using amplitude modulation, and the audio signal FM modulates an R.F. carrier which differs from the video carrier by, 4.5 to 6.5 megahertz. A diplexer or combiner is used to combine the two modulated signals.

The standard commercial broadcast tv transmitter separately modulates the video and audio on R.F. carriers separated by, e.g., 5.5 MHz and then combines the two modulated signals in a diplexer or combiner. Another technique described in the prior art is to modulate the audio onto a 5.5 MHz carrier and combine it in a diplexer or combiner with the video modulated R.F. carrier, with the output being amplified and resulting in the video and audio modulated R.F. carriers (e.g., 503 MHz and 508.5 MHz) being 5.5 MHz apart.

In either of the above cases, a diplexer or combiner is required and such devices are complicated, expensive and involve a considerable amount of circuitry and therefore are not conducive to miniturization. Examples of such devices are shown in FIGS. 21-17 and 21-18 of *Electronics Engineers' Handbook*, 1982.

Many adjustments to a television transmitter are necessary in order to be certain that a proper signal is being transmitted. For example, there are several tuned circuits which must be adjusted to insure that they are tuned to the carrier frequency for the particular channel being transmitted; the dc restoration circuitry, video and audio gain circuits, and sync stretching circuits must also be adjusted. Typically, a television transmitter includes several complex, bulky and expensive testing circuits to permit proper adjustment of the transmitter. Examples of such test circuits include a vector scope, a wide band oscilloscope, a color bar reference test generator, calibrated R.F. power meters, and S.W.R. meter, and a spectrum analyzer.

SUMMARY OF THE INVENTION

In accordance with the present invention, a tv transmitter is provided which uses relatively simple circuits having very few components and therefore can be constructed at low cost and is particularly suitable for miniturization. The composite video is applied to a simple video gain control circuit which reduces the composite video while maintaining the proper ratio between the positive and negative portions of the signal. The gain controlled video signal is applied to a video amplifier, which may be constructed with only a single emitter follower transistor. Dc level restoration is provided by a simple diode circuit connected to the video amplifier to thereby insure proper dc restoration for all types of composite video signals, i.e., PAL, NTSC, and SECAM.

The video amplifier inverts the composite video so that for the most common forms of composite video (PAL and NTSC) the horizontal sync pulses entering the sync stretcher will be negative and therefore will be less susceptible to the more common types of noise, e.g., noise in the whiter than white region.

The sync stretcher is a single ended differential amplifier which corrects the horizontal sync pulse width for the various systems. For example, in the PAL system the proper sync pulse width is 5.6 microseconds and in the NTSC system the proper sync pulse stretch is 4.7 microseconds. Control of the stretch is via a potentiometer in the bias circuitry which biases one of the transistors in the differential amplifier. The output of the differential amplifier (the composite video, inverted dc restored, and sync stretch) is applied to a low pass filter having a cutoff frequency of approximately 6.5 MHz and a video bandwidth of approximately 6 MHz in order to accommodate all of the standard video systems. The low pass filter rids the signal of high frequency noise just prior to modulation.

The filtered composite video signal and the audio signal, FM modulated onto a 5.5 MHz or the like carrier, are applied at the output of the low pass filter to a modulator which comprises an emitter follower and a mixer. The emitter follower reinverts the composite video to its correct polarity and connects the composite video and the FM modulated audio to the collector of the mixer transistor. The R.F. signal, generated by a crystal oscillator and frequency multipliers is applied to the base of the mizer transistor, resulting in an R.F. carrier modulated by the video and by the audio. The modulator provides double side band amplitude modulation. No diplexer or combiner is required with the latter circuit.

The output from the mixer is applied through band pass filters to a transmitting antenna.

An R.F. sniffer, otherwise designated an R.F. probe may be connected to the output of the band pass filters or may be a separate circuit. In either case, the R.F. sniffer picks off a portion of the signal, demodulates it, and provides an output which can be connected to a simple volt meter or a simple color monitor for examining the output and adjusting the various controls of the transmission circuitry.

The resulting tv transmitter is extremely small and inexpensive relative to present day standards and therefore will have increased applications for military, industrial and consumer uses.

The present invention provides mobile, easy to use video and sound transmission over large distances to any standard UHF television receiver operating outside the broadcast or within the commercial band. With a suitable camera and microphone, the transmitter of the present invention will transmit full color or black and white pictures to an ordinary television receiver or video tape recorder.

By connecting a VCR directly to the video input of the television transmitter of the present invention, a prerecorded program can be transmitted to any number of tv receivers over a large area thereby providing enormous versatility not provided by present state of the art systems. Additionally, although the preferred embodiment, as described in more detail below, results in a video transmitter of 3 watts power and 30 mile range, by using various power amplifiers and high gain antenna systems the power and range can be increased significantly.

Some of the uses for the small, inexpensive, low weight tv transmitter of the present invention include: communal tv relay stations in areas of bad reception, private broadcast stations for hotels, marinas and holiday sites; wireless door entry monitors in blocks of apartments; mobile emergency monitoring and high security in hazardous situations; compact, live news gathering systems; aerial surveillance via remote controlled aircraft and balloons; antiterrorist and hijack prevention systems on aircraft; shoplifting, pilferage and theft control systems; cable eliminator in CCTV installations crossing highways, etc.; mobile broadcasting stations for education and political authority; military and border surveillance; and special and scientific wildlife observations.

In general, the small size and low cost of the system permits it to be placed in areas where prior systems would be unsuitable.

DETAILED DESCRIPTION OF THE PREFERRED EMBODIMENT

Figure 7:
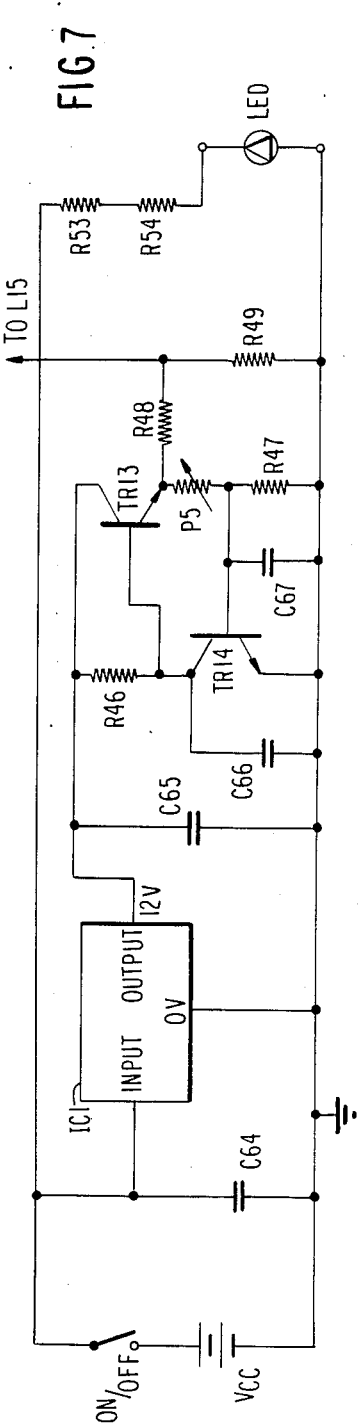
FIG. 7 is a schematic diagram of a voltage stabilizer circuit utilized in the television transmitter in accordance with a preferred embodiment of the present invention.
Figure 8:
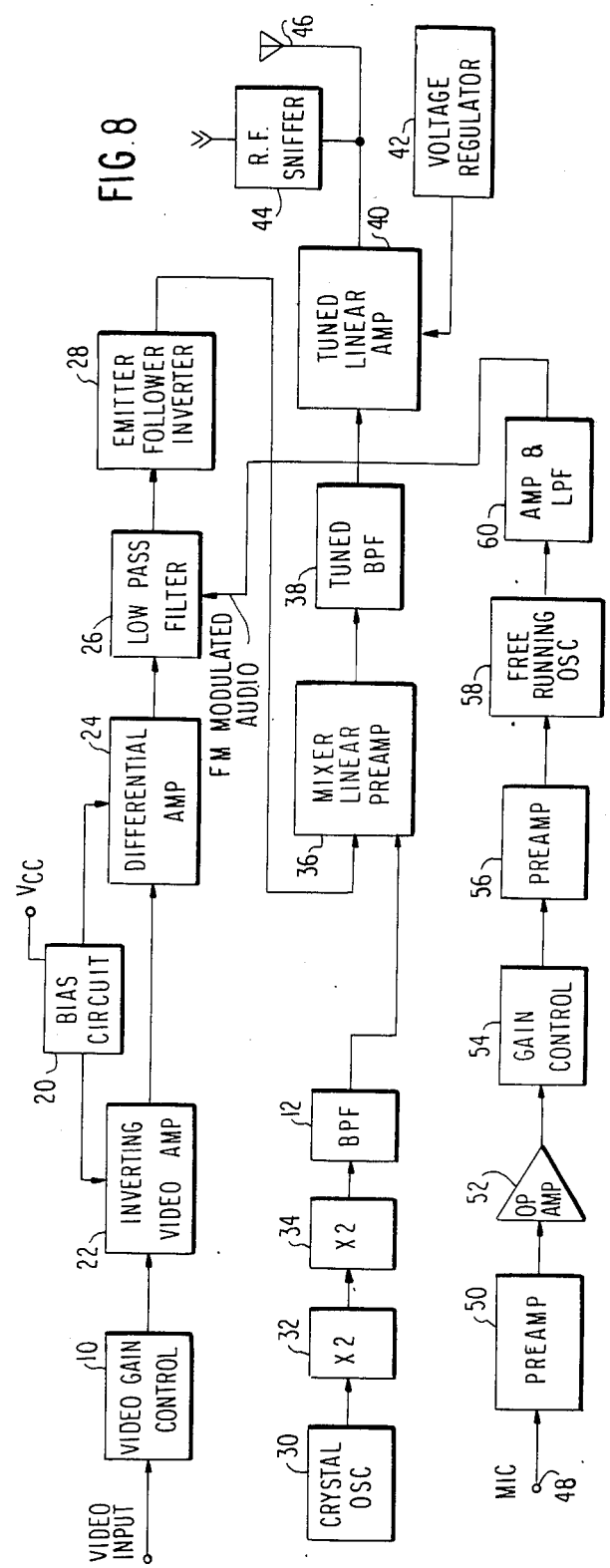
FIG. 8 is a block diagram of a preferred embodiment of the present invention.

Referring first to FIG. 8, there is shown a general block diagram of a tv transmitter in accordance with a preferred embodiment of the present invention. The numerals used to designate the individual blocks are also used in the circuit diagrams of FIGS. 1 through 7 to indicate the circuitry of the preferred embodiment which corresponds to the blocks of FIG. 8.

A one volt peak to peak composite video input, derived from any standard tv camera or other source of video signals is applied to a video gain control circuit 10 for controlling the gain of the composite video. The output therefrom is applied to an inverting video amplifier 22 whose bias is controlled by a bias circuit 20. The inverting amplifier 22 along with the bias circuit 20 operate as a dc restoration circuit. The dc restored composite video is then applied to a single ended output differential amplifier 24 whose bias is also controlled by the bias circuit 20. The differential amplifier 24 operates to stretch the horizontal sync pulses to their proper widths. The output from the differential amplifier is applied through a low pass filter 26 to a modulator consisting of an emitter follower inverter 28 and mixer/linear preamplifier 36. The low pass filter preferably has a cutoff frequency of 6.5 MHz to accommodate the PAL, NTSC, and SECAM systems. Also applied to the modulator via the output end of low pass filter 26 is an FM modulated audio signal having a carrier frequency between 4.5 and 6.5 MHz. The carrier frequency of the audio at this stage, as will be explained hereafter, determines the separation between the video and audio at the output of the transmitter.

In the modulator, the emitter follower inverter inverts the composite video back to its original polarity and applies the composite video along with the FM modulated audio to the mixer/linear preamplifier 36. Also applied to the mixer/linear preamplifier 36 is the R.F. carrier which is derived from crystal oscillator 30, frequency multipliers 32 and 34, and band pass filter 12.

The output from the mixer/linear preamplifier 36 is a double side band amplitude modulated R.F. signal which is passed through a tuned band pass filter 38 and a tuned linear amplifier 40 to a transmitting antenna 46. A voltage regulator 42 controls the bias of the tuned linear amplifier 40. An R.F. sniffer 44 picks off a portion of the R.F. signal and demodulates it for purposes of testing and adjusting controls of the transmitter.

The audio portion of the circuitry includes a microphone 48 for receiving audio, a preamplifier 50, operational amplifier 52, gain control circuit 54, second preamplifier 56, free running oscillator 58, and amplifier and low pass filter 60. The free running oscillator 58 is tunable between 4.5 and 6.5 MHz, and the amplifier and low pass filter have a cutoff frequency of 6.5 MHz. The output from the amplifier and low pass filter 60 is then audio modulated onto a carrier somewhere between 4.5 and 6.5 MHz.

Figure 1:
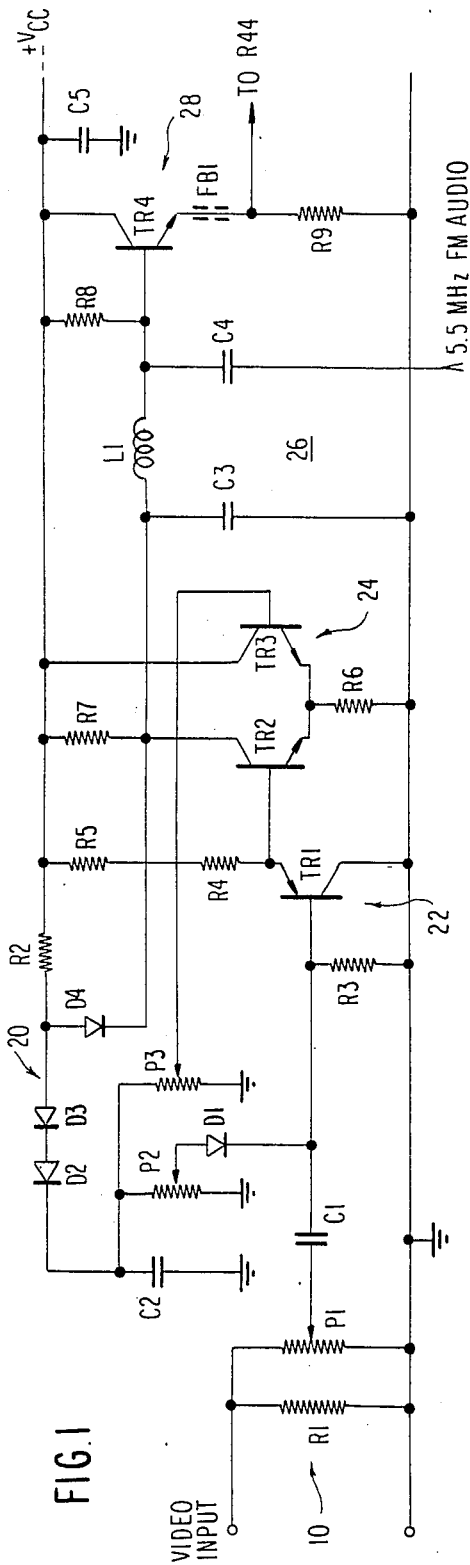
FIG. 1 is a schematic diagram of a portion of a preferred embodiment of the present invention. The schematic diagram includes the video gain control circuit, the bias circuit, the video amplifier and inverter, the sync stretcher, the low pass filter, and the emitter follower portion of the modulator.

Referring now to FIG. 1, the one volt peak to peak composite video input signal is applied to the video gain control circuit 10 consisting of resistor $R_1$ and potentiometer $P_1$. The potentiometer may be adjusted to provide the desired peak to peak voltage for inputting to the remainder of the circuitry. As one example, the peak to peak of the composite video signal output of the gain control circuit may be 0.7 volts. The purpose of the reducing the peak to peak voltage of the video in the gain control circuit 10 is to provide the dc restoration circuitry with a smaller signal that is more stable and easier to work with. The transistors utilized are of the general variety in order to keep costs to a minimum. As such the power supply, $V_{cc}$, is limited to about 10-15 volts. Also, the video peak to peak must be limited so as not to exceed the base emitter breakdown voltage. It will be appreciated that the ratio of positive to negative portions of the composite video does not change by varying the gain.

The gain adjusted video is applied via coupling capacitor $C_1$ to the base of PNP transistor $TR_1$, which along with associated biasing resistors constitutes the video amplifier and inverter 22. The coupling capacitor, along with associated resistors provides a sufficiently long charging time constant to provide symmetrical horizontal pulses, causing a minimum of tilt on the vertical axis.

The base of transistor $TR_1$ is provided with a dc bias voltage by bias circuit 20 to which the power supply $+V_{cc}$ is connected. The power supply $+V_{cc}$ may be a battery, for portable use, or a rectified ac voltage. The bias circuit 20 comprises a four diode bridge comprising zener diodes $D_2$ and $D_3$, and regular diodes $D_1$ and $D_4$. A potentiometer $P_2$ provides adjustment of the bias to the base of transistor $TR_1$.

Transistor $TR_1$ is connected in an emitter follower mode resulting in the output from the video amplifier inverter appearing at the emitter of $TR_1$ and being inverted from its original polarity. The bias circuit 20 in combination with the video amplifier inverter 22 constitutes a very simple clamping circuit for dc restoration, otherwise known as black level clamping. The proper dc level can be obtained by adjustment of potentiometer $P_2$.

The output from the video amplifier inverter 22 is applied to the base of TR2, which together with TR3 and associated resistors constitutes a differential amplifier 24 which serves, along with the bias circuit 20 as the sync stretcher. As is well known, the majority of noise which would intefer with the sync signal is white noise, i.e., positive noise. Also, it is known that the PAL and NTSC systems, which use positive horizontal sync signals, are in much greater use worldwide than the SECAM system, which uses negative horizontal sync pulses. Therefore, by using an inverting amplifier as the video amplifier 22, in the overwhelming majority of uses of the transmitter of the subject invention the sync pulses fed into the differential amplifier 24 will be negative and thereby less subject to interference by white noise. However, it should be noted that the system also operates quite well with the SECAM system composite video.

It will be appreciated however that for transmitters designed to be used only in countries which utilize the SECAM system, a noninverting video amplifier may be used.

The single ended output differential amplifier 24 serves to stretch the sync pulse to the desired value for a given system, e.g., PAL 5.6 microseconds; NTSC, 4.7 microseconds. Control of the sync stretching is maintained by adjusting the potentiometer P3 which controls the bias applied to the base of transistor TR3.

The differential amplifier eliminates or greatly minimizes many common sources of error. The drift problem encountered in direct coupled amplifiers can be handled more effectively by using a differential amplifier. Another advantage of the differential amplifier is its ability to reject common mode signals, i.e., unwanted signals present at both of the amplifier inputs or other common points. The output of the differential amplifier 24 is thus an inverted, dc restored, and sync stretched composite video signal which is then applied to a low pass filter 26 consisting of capacitors $C_3$ and $C_4$ and inductance $L_1$. The low pass filter 24 is preferably designed to have a cutoff frequency of 6.5 MHz. It will be appreciated that this frequency is high enough to accommodate all of the major video systems, NTSC, PAL, and SECAM. The low pass filter rids the signal of high frequency noise and filters it just prior to modulation.

Figure 2:
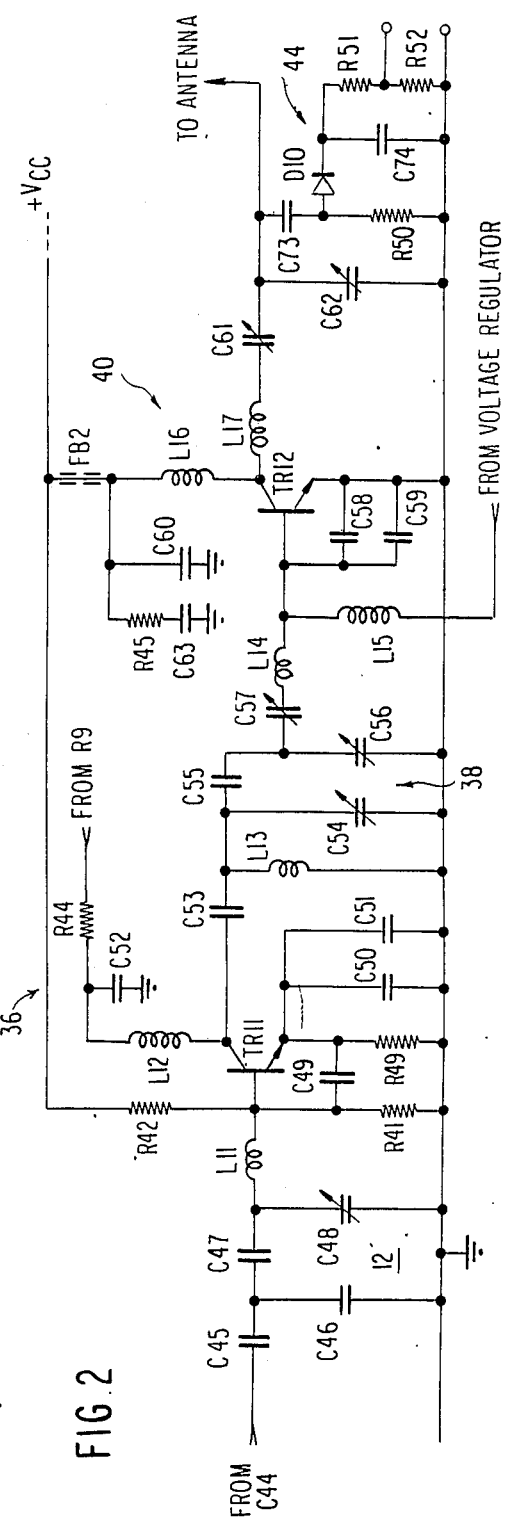
FIG. 2 is a schematic diagram of a portion of the television transmitter in accordance with a preferred embodiment. The schematic DIAGRAM includes a tuned band pass filter, a mixing and linear preamplifier, another tuned band pass filter, an R.F. linear amplifier, and an R.F. sniffer.

The modulator, as previously explained in connection with FIG. 8, consists of an emitter follower inverter 28 and a mixer/linear preamplifier 36. The emitter follower 28 is illustrated in FIG. 1 and consists of transistor TR4 and associated resistors. The mixer/linear preamplifier 36 is illustrated in FIG. 2 and consists of transistor TR11 and associated resistors capacitors and inductors. The connection between the emitter follower inverter 28, the mixer/linear preamplifier 36, and the inputs thereto is best illustrated in the partial block, partial schematic diagram of FIG. 6. Therefore, reference will be made to FIGS. 1, 2 and 6 for a description of the modulator.

As indicated above, the inverted composite video is applied to the base of emitter follower transistor TR4 (FIGS. 1 and 6) via low pass filter 26. Additionally, the audio signal, FM modulated onto a carrier between 4.5 and 6.5 MHz (e.g., 5.5 MHz) is also applied to the base of TR4. It has been found through experience that a particularly satisfactory way of applying the FM modulated audio to the modulator is via the output end of low pass filter 26. Specifically, as illustrated in FIG. 1, the FM audio is connected to the lower side of capacitor $C_4$ of the low pass filter 26.

The emitter follower TR4 inverts the video to its original polarity but has no effect on the FM audio inasmuch as the inverted FM modulated audio is the same as the noninverted FM modulated audio. The output from emitter follower transistor TR4 is connected to the mixer transistor $TR_{11}$ via resistor $R_{44}$, chock coil $L_{12}$, and bypass capacitor $C_{52}$. The chock coil $L_{12}$ and the by pass capacitor $C_{52}$ operate to shunt to ground high frequency noise and otherwise block such high frequency noise from being applied to the transistor $TR_{11}$. It will be noted that the video and FM modulated audio are supplied to the collector of mixer transistor $TR_{11}$.

Figure 6:
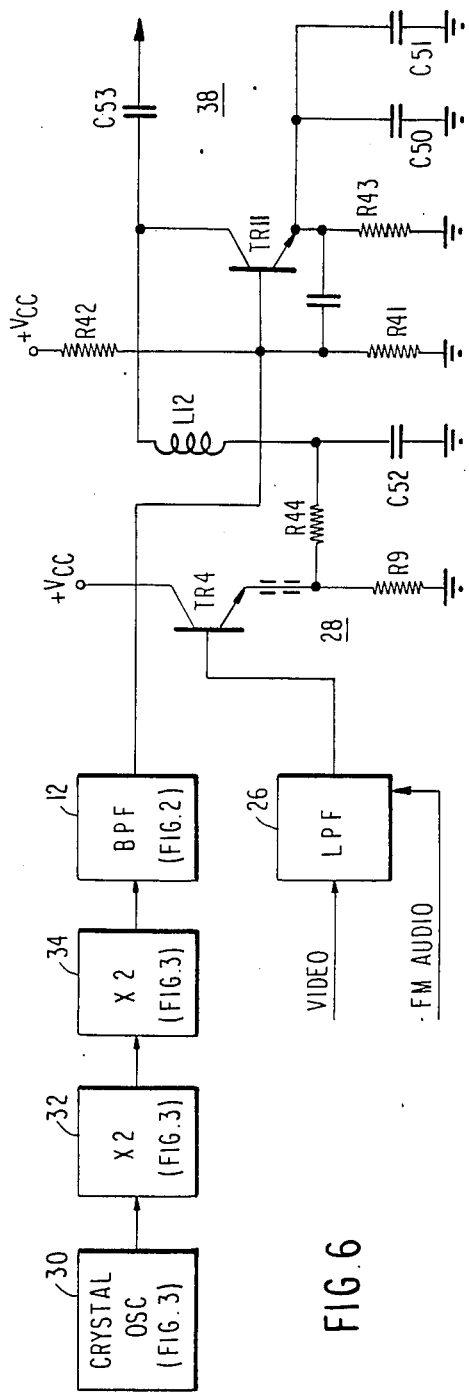
FIG. 6 is a partial block diagram and partial schematic diagram of the R.F. oscillator and modulator circuitry in accordance with a preferred embodiment of the present invention.

The R.F. signal is supplied to the base of $TR_{11}$ from a circuitry shown generally in FIG. 6 as consisting of a crystal oscillator 30, a frequency doubler 32, a frequency doubler 34, and a band pass filter 12. The crystal oscillator 30, and the frequency doublers 32 and 34 are illustrated in schematic form in FIG. 3. The band pass filter 12 is illustrated in schematic form in FIG. 2. The R.F. frequency input to the mixer is preferably in the range of 400 MHz to 600 MHz, but may go up to 860 MHz. It may be selectable by switchably selecting various crytals within crystal oscillator 30 and appropriately tuning all tuned circuits in the transmitter. Alternatively, the frequency may be selectable by replacing the crystal in the crystal oscillator with a substitute crystal operating at a different frequency and appropriately tuning all of the tuned circuits. In one example, the R.F. frequency into the mixer may be 435.5 MHz. The output of the mixer, which also constitutes the output of the modulator, will appear at the collector of transistor TR11. This signal will be an amplitude modulated video having an R.F. carrier of 435.5 MHz, and an FM audio separated from the video carrier by 5.5 MHz (or any selected frequency between 4.5 and 6.5 MHz).

In the mixer, capacitors C50 and C51 are R.F. stabilizing decoupling condensers which shunt to ground any spurious R.F. interference. R41, R42 and R43 constitute biasing resistors.

It will be appreciated that the circuit as described thus far uses a very small number of components. In particular, the video amplifier inverter 22 uses only a single transistor; the sync stretcher/differential amplifier uses only two transistors; and the modulator uses only two transistors.

Figure 3:
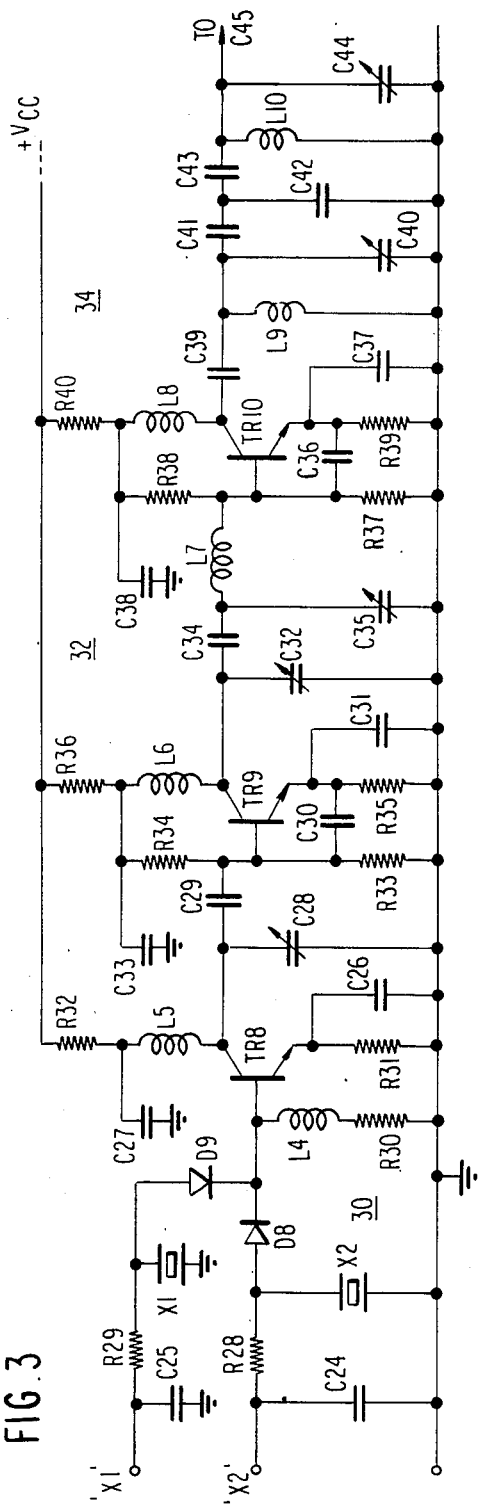
FIG. 3 is a schematic diagram of a portion of the television transmitter in accordance with a preferred embodiment. The schematic diagram includes a crystal oscillator and two frequency multipliers.

Referring to FIG. 3, there is shown one example of a suitable crystal oscillator 30, and frequency doublers 32 and 34. In the illustration two crystals $X_1$ and $X_2$ are shown. When two or more crystals are provided in the circuitry, switching means are also provided to select which of the crystals will be used based upon the desired channel transmission. If only one crystal is used in the circuit, channel selection may be accomplished by simply removing the one crystal and replacing it with another. For a final output frequency of 435.5 MHz, a crystal controlled oscillator 30 operating at 108.875 MHz would be used. The output therefrom is coupled directly to the base of TR9 which operates as a frequency doubler 32. The collector tuned circuit (L6) of doubler 32 resonator at 217.75 MHz and, together with inductance L7 forms a simple band pass filter. Transistor TR10 forms another doubler stage and brings the signal to its final frequency at 435.5 MHz. In order to insure maximum stability and spectral purity, the oscillator is powered from a three terminal voltage regulator $IC_1$ (FIG. 7) which may be a standard commercial three terminal voltage regulator as is well known in the art. As one example, a voltage regulator designated 78L05 manufactured by Thompson C.S.F. or Motorola may be used. The regulated voltage output from the regulator is connected via a switch to the terminal "$X_2$" or "$X_1$" of the oscillator circuit 30 (FIG. 3).

The output from the second frequency doubler 34 is connected to a band pass filter 12 (FIG. 2) tuned to the center R.F. frequency. A variable capacitor $C_{48}$ provides the necessary tuning. It will be noted that several variable capacitors are provided in the circuit shown in FIG. 3 for proper tuning.

Referring back to FIG. 2, the output of the mixer/linear preamplifier 36, appearing at the collector of transistor TR11, is applied to a band pass filter 38 consisting of capacitors C53–C57 and inductors L13–L14. Capacitors C54, C56 and C57 are variable capacitors to provide proper trimming of the band pass filter.

The output from the band pass filter 38 is applied to a highly stable R.F. linear amplifier 40. R.F. linear amplifier 40 includes only a single transistor TR12, is tuned, and is highly stabilized for linear amplification. Accurate stabilization is provided by applying a regulated bias voltage via choke coil L15 to the base of transistor TR12. The regulator is a standard circuit as illustrated in FIG. 7, and consists of a commercial stabilizer IC1, as described previously, and the associated resistors, capacitors and transistors as shown. The dc voltage $+V_{cc}$ is applied to the regulator via an on/off switch. When the switch is closed a light emitting diode LED, illuminates indicating that the system is turned on.

Referring back to the R.F. linear amplifier of FIG. 2, the regulated voltage is applied thereto via a choke coil L15. Capacitors C58, C59, C60 and C63 are provided to shunt to ground spurious high frequency signals. Inductancs L17 and variable capacitors C61 and C62 constitute the tuning portion of the linear amplifier which is set to the proper center frequency.

The output from the R.F. linear amplifier is connected directly to the antenna. Any transmitting antenna, preferably a tuned transmitting antenna which is asymmetric and has 50 Ohm impedance would be suitable.

Also as shown in FIG. 2, an R.F. sniffer circuit 44 is connected to the output of the R.F. linear amplifier. The R.F. sniffer is basically a demodulator circuit comprising capacitors C73 and C74, diode D10, and resistors R50–R52. This simple R.F. sniffer can be used in lieu of the extremely complicated testing equipment normally used with television transmitters. For example, the output from the R.F. sniffer could be connected to a relatively inexpensive oscilloscope having a band width of 5.5 MHz to view the demodulated composite video signal. All adjustable features of the transmission circuitry could then be adjusted as the operator views the demodulated video on the screen. Alternatively, a simple volt meter, having a band width of 5.5 MHz, could be connected to the output of the R.F. sniffer. For given R.F. frequencies, the maximum output power for the circuitry described is known. Therefore, the various adjustable parameters can be adjusted until the volt meter reaches the reading indicating maximum output power.

Alternatively, the R.F. sniffer could be separate from the circuit as shown in FIG. 2. In that case, the input to the R.F. sniffer would be a simple coil which, like a probe, could be moved from circuit to circuit within the transmitter. In this case, each of the tuned circuits could be examined separately by a simple volt meter connected to the output of the R.F. sniffer.

Figure 4:
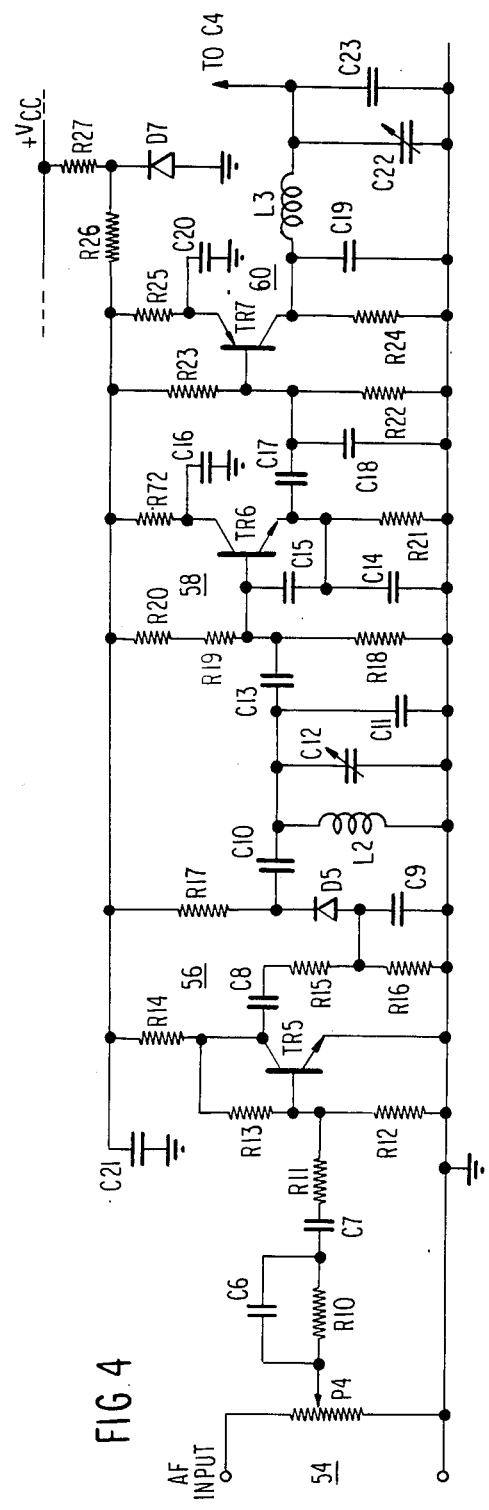
FIG. 4 is a schematic diagram of a portion of the television transmitter in accordance with a preferred embodiment. The schematic includes an audio gain adjustment circuit, a preamplifier, a free running oscillator, and an amplifier and low pass filter.
Figure 5:
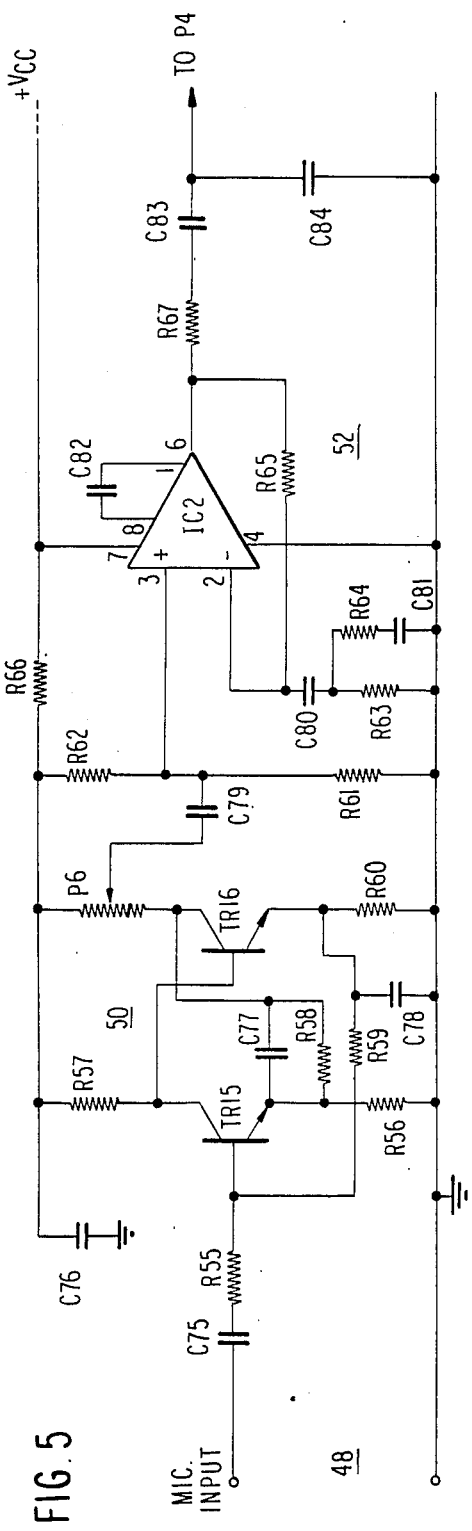
FIG. 5 is a schematic diagram of a portion of the television transmitter in accordance with the preferred embodiment. The schematic includes an audio microphone, a preamplifier, and an operational amplifier circuit.

The audio circuitry is shown in FIGS. 4 and 5, with the microphone input 48 shown on the left of FIG. 5 and the FM modulated audio output, which is applied to the R.F. modulator (previously described) shown on the right of FIG. 4. The microphone 48 receives an audio input and applies it to a preamplifier 50 which includes a pair of transistors TR15 and TR16. The output from the preamplifier is applied to an operational amplifier circuit 52 which includes a commercial operational amplifier IC2. One example of an appropriate commercial operational amplifier IC2 is a Motorola LM301 operational amplifier. The output from operational amplifier circuit 52 is applied to a gain adjusting circuit 54, which comprises the potentiometer P4 (FIG. 4). The output from the gain adjusting circuit 54 is applied to another preamplifier 56, comprising a single transistor TR5 whose output in turn is connected to a free running oscillator 58. The free running oscillator has a frequency which is variable between 4.5 and 6.5 MHz. The output therefrom is the audio signal modulated onto the carrier of the free running oscillator and is applied to the base of transistor TR7 which is part of the amplifier and low pass filter 60. The low pass filter is tunable by capacitor C22 and preferably has a cut-off frequency of 6.5 MHz to accommodate the entire range of FM carriers. The output from the amplifier and low pass filter 60 is applied to capacitor C4 of the low pass filter 26 (FIG. 1) as previously described.

A specific example of the transmitter circuitry has been constructed with the specific components listed below:

| LIST OF COMPONENTS | | | | | |
|---|---|---|---|---|---|
| ITEM | R | C | | TR[1] | D[1] | L |
| 1 | 330 R | 100 μF | 16 v. 'lytic | ZTX502 | 1N4148 | 10 μH choke |
| 2 | 470 R | 100 μF | 16 v. 'lytic | ZTX108 | 1N4148 | 10 μH choke |
| 3 | 4K7 | 15 pF | 632 cer. | ZTX108 | 1N4148 | 22 μH choke |
| 4 | 4K7 | 10 pF | 632 cer. | BFY52 | 1N4148 | .47 μH choke |
| 5 | 1K2 | .01 μF | 629 cer. | ZTX108 | MV2111 | 0.1 μH choke |
| 6 | 68 R | 220 pF | 632 cer. | ZTX314 | 1N4148 | 21/2T 22 swg 4 mm i.d. |
| 7 | 2K2 | .047 μF | 352 | ZTX502 | 8.2 V | 21/2T 22 swg 4 mm i.d. |
| 8 | 2K2 | .1 μF | 352 | BF357K | BA379 | .22 μH choke |
| 9 | 2K2 | 1000 pF | 630 cer. | BF357K | BA379 | 11/2T 22 swg 4 mm i.d. |
| 10 | 220K | 1000 pF | 630 cer. | 2N4427 | 1N4148 | 11/2T 22 swg 4 mm i.d. |
| 11 | 33K | 1000 pF | 630 cer. | 2N4427 | | 11/2T 22 swg 4 mm i.d. |
| 12 | 82K | 5–45 pF | DAU var. | SD1135 | | .22 μH choke |
| 13 | 470K | 47 pF | 632 cer. | ZTX108 | | 11/2T 22 swg 4 mm i.d. |
| 14 | 10K | 220 pF | 632 cer. | ZTX108 | | 11/2T 22 swg 4 mm i.d. |
| 15 | 10K | 68 pF | 632 cer. | ZTX108 | | .22 μH choke |
| 16 | 100K | .01 μF | 629 cer. | ZTX108 | | 31/2T 22 swg 4 mm i.d. |
| 17 | 100K | 4.7 pF | 632 cer. | | | 21/2T 22 swg 4 mm i.d. |
| 18 | 10K | 4.7 pF | 632 cer. | IC1 = 78LO5 Voltage Regulator IC | | |
| 19 | 15K | 100 pF | 632 cer. | IC2 = LM301 Microphone Amplifier IC | | |
| 20 | 8K2 | .01 μF | 629 cer. | | | |
| 21 | 680 R | 10 μF | 16 v. 'lytic | | | |
| 22 | 10K | 2–22 pF | 808 var. | | | |

-continued

LIST OF COMPONENTS

| | | | | |
|---|---|---|---|---|
| 23 | 10K | 15 pF | 632 cer. | |
| 24 | 390 R | 1000 pF | 630 cer. | |
| 25 | 820 R | 1000 pF | 630 cer. | |
| 26 | 33 R | 15 pF | 632 cer. | |
| 27 | 270 R | 1000 pF | 630 cer. | |
| 28 | 2K2 | 2-22 pF | 808 var. | |
| 29 | 2K2 | 5.6 pF | 632 cer. | P1 = 100 R Potentiometer |
| 30 | 270 R | 5.6 pF | 632 cer. | P2 = 100 R Potentiometer |
| 31 | 220 R | 1000 pF | 630 cer. | P3 = 100 R Potentiometer |
| 32 | 100 R | 2-10 pF | 808 var. | P4 = 47K Potentiometer |
| 33 | 2K2 | 1000 pF | 630 cer. | P5 = 100 R Potentiometer |
| 34 | — | 1.8 pF | 632 cer. | P6 = 10K Potentiometer |
| 35 | 220 R | 2-22 pF | 808 var. | |
| 36 | 100 R | 22 pF | 632 cer. | $FB_1$ = FX1115 Ferrite R.F. Pearl |
| 37 | 1K0 | 1000 pF | 630 cer. | $FB_2$ = FX1115 Ferrite R.F. Pearl |
| 38 | 10K | 1000 pF | 630 cer. | |
| 39 | 33 R | 4.7 pF | 632 cer. | pins = H2105 Crystal Mounting Pins |
| 40 | 33 R | 1.4–5.5 pF | 808 var. | $X_1, X_2$ = fo/4 HC18/U Crystals |
| 41 | 68 R | 1.8 pF | 632 cer. | |
| 42 | 1K5 | 4.7 pF | 632 cer. | |
| 43 | 1R0 | 1.8 pF | 632 cer. | |
| 44 | 3R3 | 1.4–5.5 pf | 808 var. | |
| 45 | 4R7 | 1.8 pF | 632 cer. | |
| 46 | 2K2 | 1.8 pF | 632 cer. | |
| 47 | 150 R | 1.8 pF | 632 cer. | |
| 48 | 10 R | 1.4–5.5 pF | 808 var. | |
| 49 | 33 R | 22 pF | 632 cer. | |
| 50 | 470 R | 1000 pF | 630 cer. | |
| 51 | 2K2 | 1000 pF | 630 cer. | |
| 52 | 1K2 | 100 pF | 632 cer. | |
| 53 | 220 R | 2.7 pF | 632 cer. | |
| 54 | 220 R | 1.4–5.5 pF | 808 var. | |
| 55 | 4K7 | 1.8 pF | 632 cer. | |
| 56 | 4K7 | 2-22 pF | 808 var. | |
| 57 | 150K | 2-10 pF | 808 var. | |
| 58 | 470K | 18 pF | 632 cer. | |
| 59 | 82K | 18 pF | 632 cer. | |
| 60 | 2K2 | 1000 pF | 630 cer. | |
| 61 | 5M6 | 2-10 pF | 808 var. | |
| 62 | 4M7 | 2-10 pF | 808 var. | |
| 63 | 100K | .047 μF | 352 | |
| 64 | 47K | 100 μF | 16 V. 'lytic | |
| 65 | 2M2 | 10 μF | 16 V. 'lytic | |
| 66 | 2K2 | .01 μF | 629 cer. | |
| 67 | 10K | 1000 pF | 630 cer. | |
| 73 | | 1.8 pF | 632 cer. | |
| 74 | | 10 pF | 632 cer. | |
| 75 | | .01 μF | 629 cer. | |
| 76 | | 10 μF | 16 V. 'lytic | |
| 77 | | 47 pF | 632 cer. | |
| 78 | | 10 μF | 16 V. 'lytic | |
| 79 | | 100 pF | 630 cer. | |
| 80 | | .01 μF | 629 cer. | |
| 81 | | 1200 pF | 630 cer. | |
| 82 | | 10 pF | 632 cer. | |
| 83 | | 1 μF | 16 V. 'lytic | |
| 84 | | 1200 pF | 630 cer. | |

[1]Standard European designations are used in the table.

The transmitter built in accordance with the above, and using discrete components has the following technical characteristics:

| | |
|---|---|
| Frequency range | 400 MHz to 600 MHz (up to 860 MHz on request) |
| Frequency stability | 0.004%, −20° to +50° C. |
| Channels | Commercial 21 to 28 Non Commercial (400 MHz to 468 MHz) |
| Carrier source | Crystal control (Overtone) |
| Output power | 3 Watts Min. Peak sync. at 13.8 V P.S. |

-continued

| | |
|---|---|
| Permissable V.S.W.R. | <1.3. |
| Spurious output | <−65 dBC |
| Color system | PAL, NTSC, SECAM B (SECAM L B/W) |
| TV Standard (Normal Model) | G (Other, K, H, I, M, N.) |
| Class of emission | Vision: Negative Sound: FM/4.5 Mhz, 5.5 MHz, 6 MHz, 6.5 MHz. |
| Video input | Standard 1 V p.p. + Sync. 75 Ohms. |
| Vision/Sound power ratio | 10:1 |
| Video adjustments | Video gain, Black level, Sync. stretching. |

-continued

| | |
|---|---|
| Video modulation bandwidth | 5 MHz (−3 dB) |
| Video modulation system | DSB AM Negative |
| Audio modulation system | FM MOD on DSB AM subcarrier |
| Audio subcarrier frequency deviation | <50 KHz |
| Audio input | Option 1: 1 V. RMS, 47K (±50 KHz DEV) 1 KHz 50μ p.c. Option 2: 10 mV. RMS, 82K "Electret Microphone" |
| Audio bandwidth | 50 Hz–20 KHz |
| Operational conditions | −15 to 60 degrees C. |
| Dimensions | 40 × 150 × 200 mm. |
| Weight | 750 g |

The above 3 watt system when used with a directional beam multi-element Yagi antenna, has been found to have a range of over 30 miles.

It will be apparent that the transmitter in accordance with the present invention is significantly less complex, reduced in weight, and reduced in size compared to previously available equipment, using only about 200 components. Additional components, of course could be added to give the invention transceiving capabilities.

Additionally, the transmitter can be miniturized even further by using integrated circuits or hybrid integrated circuits. However, inasmuch as integrated circuit technology is readily expensive unless used for circuits having many thousands of components, the subject invention is more applicable to hybrid integrated circuits inasmuch as it includes only about 200 components. Constructed as a hybrid circuit, the transmitter of the present invention will have dimensions of approximately 5 cm. width×1 cm. height×2 cm depth, and will weigh less than 100 g, while providing the same power and range as a discrete component circuit.

I claim:

1. A tv transmitter comprising:
   a video amplifier for amplifying a composite video signal applied at an input thereof;
   a single ended differential amplifier connected to said video amplifier for amplifying the output of said video amplifier;
   a low pass filter connected to the output of said differential amplifier for filtering out high frequency components;
   a modulator connected to receive the output of said low pass filter and an r.f. carrier for modulating the video signal output from said low pass filter onto said r.f. carrier; and
   bias circuit means connected to said video amplifier for providing a variable bias thereto to adjust the dc level of said video signal.

2. A tv transmitter as claimed in claim 1 wherein said video amplifier has only one transistor, said one transistor being connected in an emitter follower mode to invert the input signal applied thereto, said composite video signal and said variable bias being applied to the base of said one transistor, and the output therefrom being taken from the emitter of said one transistor.

3. A tv transmitter as claimed in claim 1 wherein said bias circuit means is also connected to said differential amplifier for applying a variable bias thereto to adjust the width of the sync pulses in the composite video signal applied thereto from said video amplifier.

4. A tv transmitter as claimed in claim 3 wherein said bias circuit means comprises two potentiometers and a diode bridge circuit adapted to be connected to a power supply, said two potentiometers providing the variable bias voltages to said video amplifier and differential amplifiers, respectively.

5. A tv transmitter as claimed in claim 4 wherein said video amplifier has only one transistor, said one transistor being connected in an emitter follower mode to invert the input signal applied thereto, said composite video signal and said variable bias being applied to the base of said one transistor, and the output therefrom being taken from the emitter of said one transistor.

6. A tv transmitter as claimed in claim 1 wherein the entire circuit from said video amplifier to and including said modulator comprises no more than five transistors.

7. A tv transmitter as claimed in claim 1 further comprising a video gain control circuit connected at the input of said video amplifier.

8. A tv transmitter as claimed in claim 7 wherein said video gain control circuit consists of a resistor and a potentiometer connected in parallel, said video signal being applied across said parallel connection, and the output therefrom to said video amplifier being taken from said potentiometer.

9. A tv transmitter as claimed in claim 5 wherein said differential amplifier comprises no more than two transistors connected in a common emitter mode, the output from said video amplifier being connected to the base of one of said transistors, the variable bias being applied to the base of the other of said transistors, and the output to said low pass filter being taken from the collector of said one transistor.

10. A tv transmitter as claimed in claim 1 wherein said modulator consists of an emitter follower inverter circuit for inverting the output of said low pass filter, and a mixer/linear preamplifier for mixing the output of said emitter follower circuit with said r.f. carrier.

11. A tv transmitter as claimed in claim 10 wherein said mixer/linear preamplifier includes only a single transistor, the output from said emitter follower being connected to the collector of said single transistor and said r.f. carrier being connected to the base of said single transistor.

12. A tv transmitter as claimed in claim 1 further comprising means for f.m. modulating an audio signal onto an r.f. subcarrier and applying it to said modulator via the output side of said low pass filter.

13. A tv transmitter as claimed in claim 12 wherein said low pass filter comprises an input capacitor, and output capacitor and an inductor connected therebetween, the output from said low pass filter being taken from the junction of said inductance and said output capacitor, said audio modulated subcarrier being applied to the opposite side of said output capacitor.

14. A tv transmitter as claimed in claim 1 further comprising an r.f. sniffer circuit for connection in said transmitter to provide an output representing the adjustment condition of at least parts of said transmitter, said r.f. sniffer comprising an r.f. demodulator.

15. A tv transmitter as claimed in claim 1 further comprising, a tunable band-pass filter connected to the output of said modulator, a tunable linear amplifier connected to the output of said band-pass filter, and a means for providing a highly stabilized bias voltage to said tunable linear amplifier.

16. A tv transmitter as claimed in claim 15 further comprising an r.f. sniffer circuit for connection in said transmitter to provide an output representing the adjustment condition of at least parts of said transmitter, said r.f. sniffer comprising an r.f. demodulator.

17. A tv transmitter as claimed in claim 16 wherein said r.f. sniffer is connected to the output of said tunable linear amplifier.

18. A tv transmitter as claimed in claim 9 wherein said modulator consists of an emitter follower inverter circuit for inverting the output from said low pass filter, and a mixer/linear preamplifier for mixing the output of said emitter follower circuit with said r.f. carrier.

19. A tv transmitter as claimed in claim 18 wherein said mixer/linear preamplifier includes only a single transistor, the output from said emitter follower being connected to the collector of said single transistor and said r.f. carrier being connected to the base of said single transistor.

20. A tv transmitter as claimed in claim 19 further comprising a video gain control circuit connected at the input of said video amplifier.

21. A tv transmitter as claimed in claim 20 wherein said video gain control circuit consists of a resistor and a potentiometer connected in parallel, said video signal being applied across said parallel connection, and the output therefrom to said video amplifier being taken from said potentiometer.

22. A tv transmitter as claimed in claim 21 further comprising means for f.m. modulating an audio signal onto an r.f. subcarrier and applying it to said modulator via the output side of said low pass filter.

23. A tv transmitter as claimed in claim 12 wherein said low pass filter comprises an input capacitor, and output capacitor and an inductor connected therebetween, the output from said low pass filter being taken from the junction of said inductance and said output capacitor, said audio modulated subcarrier being applied to the opposite side of said output capacitor.

24. A tv transmitter as claimed in claim 23 further comprising, a tunable band-pass filter connected to the output of said modulator, a tunable linear amplifier connected to the output of said band-pass filter, and a means for providing a highly stabilized bias voltage to said tunable linear amplifier.

25. A tv transmitter as claimed in claim 24 further comprising an r.f. sniffer circuit for connection in said transmitter to provide an output representing the adjustment condition of at least parts of said transmitter, said r.f. sniffer comprising an r.f. demodulator.

26. A tv transmitter as claimed in claim 45 wherein said r.f. sniffer is connected to the output of said tunable linear amplifier.

27. A tv transmitter comprising:
a video amplifier for amplifying a composite video signal applied at an input thereof;
a single ended differential amplifier connected to said video amplifier for amplifying the output of said video amplifier;
a low pass filter connected to the output of said differential amplifier for filtering out high frequency components;
and a modulator connected to receive the output of said low pass filter and an r.f. carrier for modulating the video signal output from said low pass filter onto said r.f. carrier; and
bias circuit means connected to said differential amplifier for applying a variable bias thereto to adjust the width of the sync pulses in the composite video signal applied thereto from said video amplifier.

28. A tv transmitter as claimed in claim 27 further comprising, a tunable band-pass filter connected to the output of said modulator, a tunable linear amplifier connected to the output of said band-pass filter, and a means for providing a highly stabilized bias voltage to said tunable linear amplifier.

29. A tv transmitter as claimed in claim 28 further comprising an r.f. sniffer circuit for connection in said transmitter to provide an output representing the adjustment condition of at least parts of said transmitter, said r.f. sniffer comprising an r.f. demodulator.

30. A tv transmitter as claimed in claim 29 wherein ssaid r.f. sniffer is connected to the output of said tunable linear amplifier.

31. A tv transmitter as claimed in claim 27 wherein said differential amplifier comprises no more than two transistors connected in a common emitter mode, the output from said video amplifier being connected to the base of one of said transistors, the variable bias being applied to the base of the other of said transistors, and the output to said low pass filter being taken from the collector of said one transistor.

32. A tv transmitter as claimed in claim 27 wherein the entire circuit from said video amplifier to and including said modulator comprises no more than five transistors.

33. A tv transmitter as claimed in claim 29 further comprising a video gain control circuit connected at the input of said video amplifier.

34. A tv transmitter as claimed in claim 33 wherein said video gain control circuit consists of a resistor and a potentiometer connected in parallel, said video signal being applied across said parallel connection, and the output therefrom to said video amplifier being taken from said potentiometer.

35. A tv transmitter as claimed in claim 27 wherein said modulator consists of an emitter follower inverter circuit for inverting the output from said low pass filter, and a mixer/linear preamplifier for mixing the output of said emitter follower circuit with said r.f. carrier.

36. A tv transmitter as claimed in claim 35 wherein said mixer/linear preamplifier includes only a single transistor, the output from said emitter follower being connected to the collector of said single transistor, and said r.f. carrier being connected to the base of said single transistor.

37. A tv transmitter as claimed in claim 27 further comprising means for f.m. modulating an audio signal onto an r.f. subcarrier and applying it to said modulator via the output side of said low pass filter.

38. A tv transmitter as claimed in claim 37 wherein said low pass filter comprises an input capacitor, an output capacitor and an inductor connected therebetween, the output from said low pass filter being taken from the junction of said inductance said output capacitor, said audio modulated subcarrier being applied to the opposite side of said output capacitor.

39. A tv transmitter as claimed in claim 3 further comprising an r.f. sniffer circuit for connection in said transmitter to provide an output representing the adjustment condition of at least parts of said transmitter, said r.f. sniffer comprising an r.f. demodulator.

40. A tv transmitter as claimed in any of claims 1–39, further comprising a transmitter housing and weighing, including said housing, less than one kilogram.

41. A tv transmitter as claimed in any of claims 1–39 having a total number of electrical components less than approximately 210.

* * * * *